United States Patent
Chen et al.

[19]

[11] Patent Number: 6,117,283
[45] Date of Patent: *Sep. 12, 2000

[54] SILICON COATING ON AIR BEARING SURFACE FOR MAGNETIC THIN FILM HEADS

[75] Inventors: Pei C. Chen, Cupertino; Grace Lim Gorman, San Jose; Cherngye Hwang, San Jose; Vedantham Raman, San Jose; Randall George Simmons, San Jose, all of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,479

[22] Filed: Dec. 5, 1996

Related U.S. Application Data

[62] Division of application No. 08/686,567, Jul. 26, 1996.

[51] Int. Cl.[7] ............................ C23C 14/34; C23C 16/00
[52] U.S. Cl. ............................ 204/192.23; 204/192.16; 204/192.22; 427/574; 427/578; 427/583; 427/588; 427/248.1; 427/255.18; 427/255.27; 427/255.393
[58] Field of Search ........................ 204/192.16, 192.22, 204/192.23, 192.2; 427/574, 578, 579, 583, 588, 248.1, 127, 130, 131, 355.18, 255.27

[56] References Cited

U.S. PATENT DOCUMENTS

| | | | |
|---|---|---|---|
| 5,136,775 | 8/1992 | Onoe et al. | 29/603.12 |
| 5,159,508 | 10/1992 | Grill et al. | 360/103 |
| 5,175,658 | 12/1992 | Chang et al. | 360/103 |
| 5,198,934 | 3/1993 | Kubo et al. | 360/104 |
| 5,305,165 | 4/1994 | Brezoczky et al. | 360/103 |
| 5,323,283 | 6/1994 | Sano | 360/103 |
| 5,336,550 | 8/1994 | Ganapathi et al. | 428/216 |
| 5,384,195 | 1/1995 | Bachmann et al. | 428/408 |
| 5,388,017 | 2/1995 | Franco et al. | 360/103 |
| 5,473,486 | 12/1995 | Nepela et al. | 360/103 |

FOREIGN PATENT DOCUMENTS

| | | |
|---|---|---|
| 3-25716 | 2/1991 | Japan . |
| 8-190710 | 7/1996 | Japan . |

OTHER PUBLICATIONS

Petersen. IBM Technical Disclosure Bulletin "Thin Film Magnetic Heads", vol. 21, No. 12, pp.5002, May 1979.
K. E. Petersen, "Thin Film Magnetic Heads," *IBM Technical Disclosure Bulletin*, vol. 21, No. 12, May 1979, p. 5002.

*Primary Examiner*—Rodney McDonald
*Attorney, Agent, or Firm*—Altera Law Group, LLC

[57] ABSTRACT

A silicon coating on an air bearing surface for magnetic thin film heads. A thick silicon layer is provided to replace metallic layers such as TiW as an overcoat for thin film heads. The silicon layer will provide a durable head-disk interface and act as a reflective surface for fly height measurement. The silicon layer can be planarized with the pole tips to avoid any magnetic spacing loss. The thickness of the silicon coating is preferably between 125 and 6500 Angstroms thick. The slider body may be fabricated from silicon such that the silicon coating is substantially identical to the silicon slider body, thereby preventing thermal mismatch therebetween. The silicon coating is preferably applied using a magnetron sputtering technique which provides a high rate of deposition of silicon to form a dense, low stress silicon layer.

11 Claims, 5 Drawing Sheets

SILICON COATING ON AIR BEARING SURFACE FOR MAGNETIC THIN FILM HEADS

This is a Divisional of application Ser. No. 08/686,567, filed Jul. 26, 1996, which application are incorporated herein by reference pending.

BACKGROUND OF THE INVENTION

1. Field of the Invention

This invention relates in general to sliders for magnetic thin film heads, and more particularly, to sliders for magnetic thin film heads having a silicon coating formed over the air bearing surface thereof.

2. Description of Related Art

Magnetic disk devices have been in widespread use and are popular as external storage. A magnetic disk device includes a magnetic disk, a motor for rotating the magnetic disk, a slider radially movable along the magnetic disk, and a magnetic head mounted on the slider to perform data read and write operations with respect to the magnetic disk.

Achieving higher recording densities has required a reduction in the separation between the head and the surface of the magnetic disk. Storage systems in use commercially today use a slider that rides on a hydrodynamic air bearing during normal operation. The disk is typically coated with a lubricant, such as perfluoropolyether (PFPE), to prevent wear to the disk and slider during contact start and stop maneuvers and occasional asperity contacts. Two primary recording concepts are currently being used: true contact and near-contact recording. True contact recording uses very small sliders coated with low wear rate materials that are allowed to slide directly against the disk. In near-contact recording, a liquid bearing surface or an air bearing surface is used to separate the head from the disk.

Nevertheless, with either recording concept, the slider may rest upon the surface of the magnetic disk when not in use. During information retrieval and recording, however, the magnetic disk is rotated. When the disk first begins rotating, the slider slides along the surface of the magnetic disk. With near-contact recording, as the rotational speed of the disk increases, a boundary layer of air is formed which causes the slider to lift off of the disk and "fly" above the surface of the disk. When the power to the disk drive is once again shut off, the disk rotational speed gradually decreases, and the slider lands upon the disk, sliding along the surface of the disk until the disk comes to rest.

Several problems arise from the contact of the slider with the disk. With respect to both types of recording systems, the slider may be sliding directly in contact with the disk surface during start up and slow down of the disk. This frictional contact causes wear of the disk and slider. The excessive wear on the disk reduces the effective useful life of the disk.

Furthermore, even with near-contact recording systems, contact between the slider and disk also may occur when the disk is at full rotational speed. Although the boundary layer of air normally acts to support the slider above the disk, high points (asperities) on the otherwise smooth surface of the disk at times cause the slider to make contact with these projections on the disk. When the slider impacts these asperities on the disk, the slider often gouges the disk surface, further degrading the disk surface, as well as causing damage to the head and slider.

Accordingly, there is a need to protect the slider and disk surface from damage, namely by depositing a final layer at the air bearing surface in the fabrication of magnetic thin film heads. This surface provides a durable interface between the head and disk during file operation. Another function of the final layer is to provide a surface on which the flyheight can be measured, e.g. a surface with simple and consistent optical properties. In order to provide a durable interface, a low friction, durable and mechanically tough coating is required. In order to provide surface conducive to fly height measurements, an optically reflective, single layer material is required. Many materials, such as SiN, SiC, TiN, DLC, TiW etc. have been tried. Nevertheless, all such materials have failed either by the first or second criteria. For example, in the case of a silicon slider, the coating is not identical to the silicon slider body, which creates thermal mismatches and mechanical stresses. Thus, a stable slider dimension (crown, camber, pitch, etc.) can not be maintained with the temperature excursion encountered by the file.

To overcome the head disk interface durability problem with metallic layers such as TiW, a thin and durable hydrogenated carbon overcoat has been applied as the final step in head fabrication.

U.S. Pat. No. 5,159,508 to Grill, et al., and U.S. Pat. No. 5,175,658 to Chang et al., both of which are incorporated by reference herein, describe the use of a DC biased substrate in an RF plasma deposition apparatus to deposit an adhesion layer and a thin layer of carbon upon the air bearing surface of a slider. These references describe depositing an adhesion layer to a thickness of between 10 and 50 Angstroms (i.e., 1 to 5 nm), and a carbon layer to a thickness of 50–1000 Angstroms (i.e., 5 to 100 nm) upon the flat surface of a slider. An etching technique is then used to form a patterned area, which includes rails, on the air bearing surface. A solvent is then used to remove the photoresist layer which is used to control the etching.

These methods suffer from several disadvantages. Primarily, the Grill and Chang references disclose a method by which the protective coating (plus a masking layer as described in the Chang reference), is placed to protect the slider. These layers are necessary to protect the slider during subsequent etching which is done to form the patterned air bearing surface, and for subsequent solvent removal of the photoresist layer after etching.

Unfortunately, this method requires the placement of a substantial thickness of coating across the entire slider so that the sensor will not be damaged during the etching process. Further, this method does not allow control over the depth of the coating material across the air bearing surface of the slider. In particular, during the etching and solvent removal steps, which are done to form the patterned surface in the slider and to remove a photoresist material, the coating is removed in an uncontrolled fashion This causes the coating thickness to vary across the air bearing surface of the slider.

A further problem with this method is that the magnetic spacing is increased by the thickness of this carbon overcoat. This increase in magnetic spacing is significant in the low flying height file because it can occupy as much as 50% of the total spacing and degrade the file performance.

Thus it can be seen that there is a need for overcoat material, which has the better combination of durability and optical properties compared to TiW.

It also can be seen that there is a need for an overcoat material that is compatible with different slider body materials such as silicon which imposes little concern about the thermal expansion and mechanical stress effects on the slider.

It can also be seen then that there is a need for an overcoat material that does not create magnetic spacing loss.

SUMMARY OF THE INVENTION

To overcome the limitations in the prior art described above, and to overcome other limitations that will become apparent upon reading and understanding the present specification, the present invention discloses a silicon coating on an air bearing surface for magnetic thin film heads.

The present invention solves the above-described problems by providing a thick silicon layer to replace metallic layers such as TiW as an overcoat for thin film heads. The silicon layer will provide a durable head-disk interface and act as a reflective surface for fly height measurement. The silicon layer can be planarized with the pole tips to avoid any magnetic spacing loss. Further, the slider incorporating the invention is applicable in both contact and near-contact recording systems.

A system in accordance with the principles of the present invention includes a slider structure having leading and trailing ends, a patterned area on said slider structure forming an air bearing surface and a protective silicon coating on the patterned area.

One aspect of the present invention is that the patterned area includes at least one rail.

Another aspect of the present invention is that the thickness of the silicon coating is in the vicinity of 125 Angstroms thick, or substantially 125 Angstroms.

Another aspect of the present invention is that the thickness of said protective coating is in the vicinity of 6500 Angstroms or less.

Another aspect of the present invention is that the slider structure is fabricated from silicon, the silicon coating being identical, or substantially identical, to the silicon slider body thereby preventing thermal mismatch therebetween.

Still another aspect of the present invention is that the silicon coating comprises optical properties which provide a good reference surface for accurate flyheight measurement.

Another aspect of the present invention is that the silicon layer is planarized to prevent magnetic spacing loss.

Another aspect of the present invention is that the silicon coating is applied using a sputtering technique.

Yet another aspect of the present invention is that the sputtering technique provides a high rate of deposition of silicon to form a dense, low stress silicon layer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a thick silicon layer to replace metallic layers such as TiW as an overcoat for thin film heads. The silicon layer will provide a durable interface between a transducer and storage medium, while also acting as a reflective surface for fly height measurement. Further, the silicon layer can be planarized with the pole tips to avoid any magnetic spacing loss.

Figure 1:
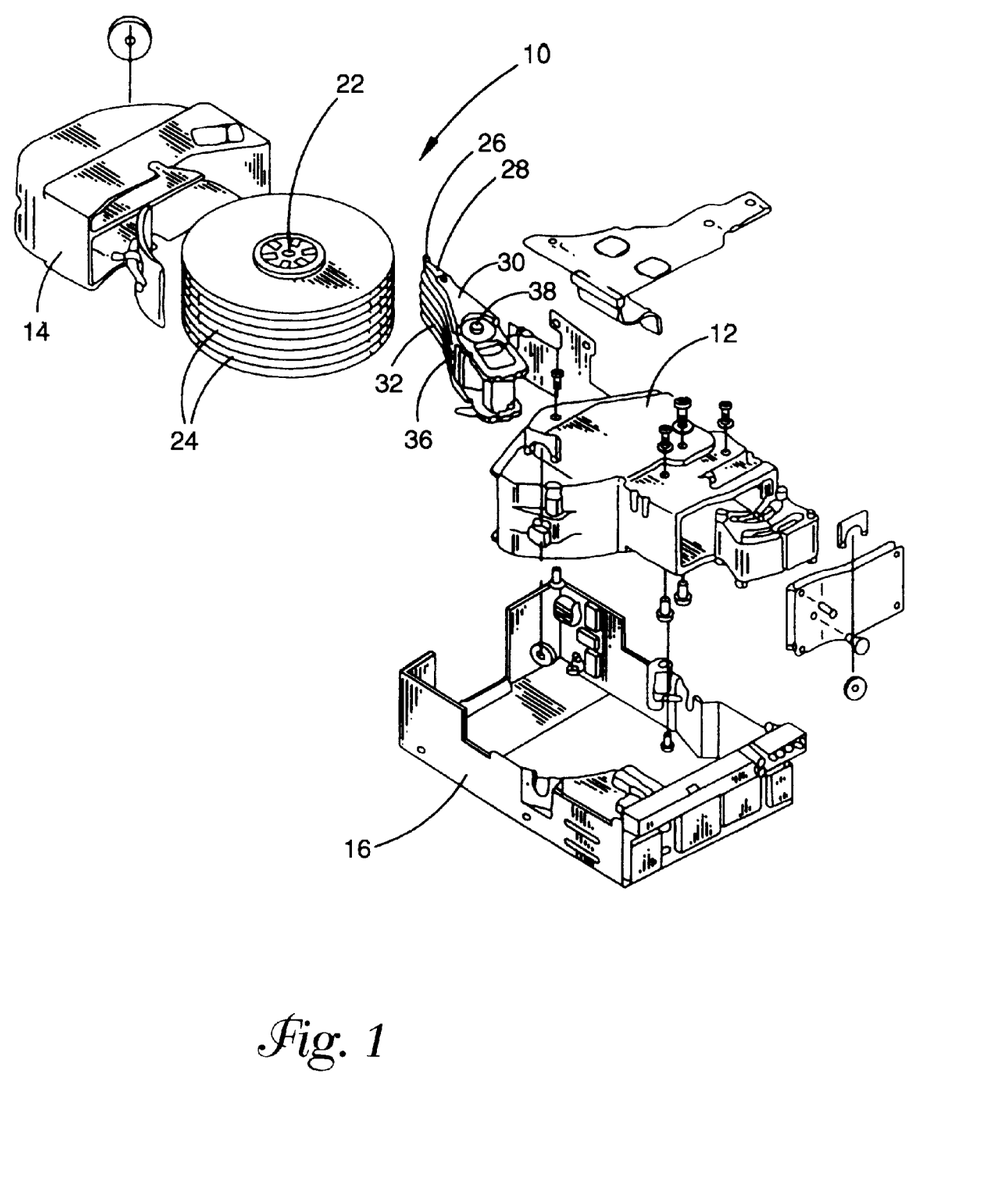
FIG. 1 illustrates an exploded view of a magnetic storage system.

FIG. 1 illustrates an exploded view of a magnetic storage system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, multiple disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, sliders 26 according to the invention are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. However, those skilled in the art will recognize that the invention is not meant to be limited to use in the particular storage device described above. For example, those skilled in the art will recognize that magnetic thin film heads having a silicon coating on the air bearing surface thereof according to the invention are equally applicable to other recording devices such as tape drives.

Figure 2:
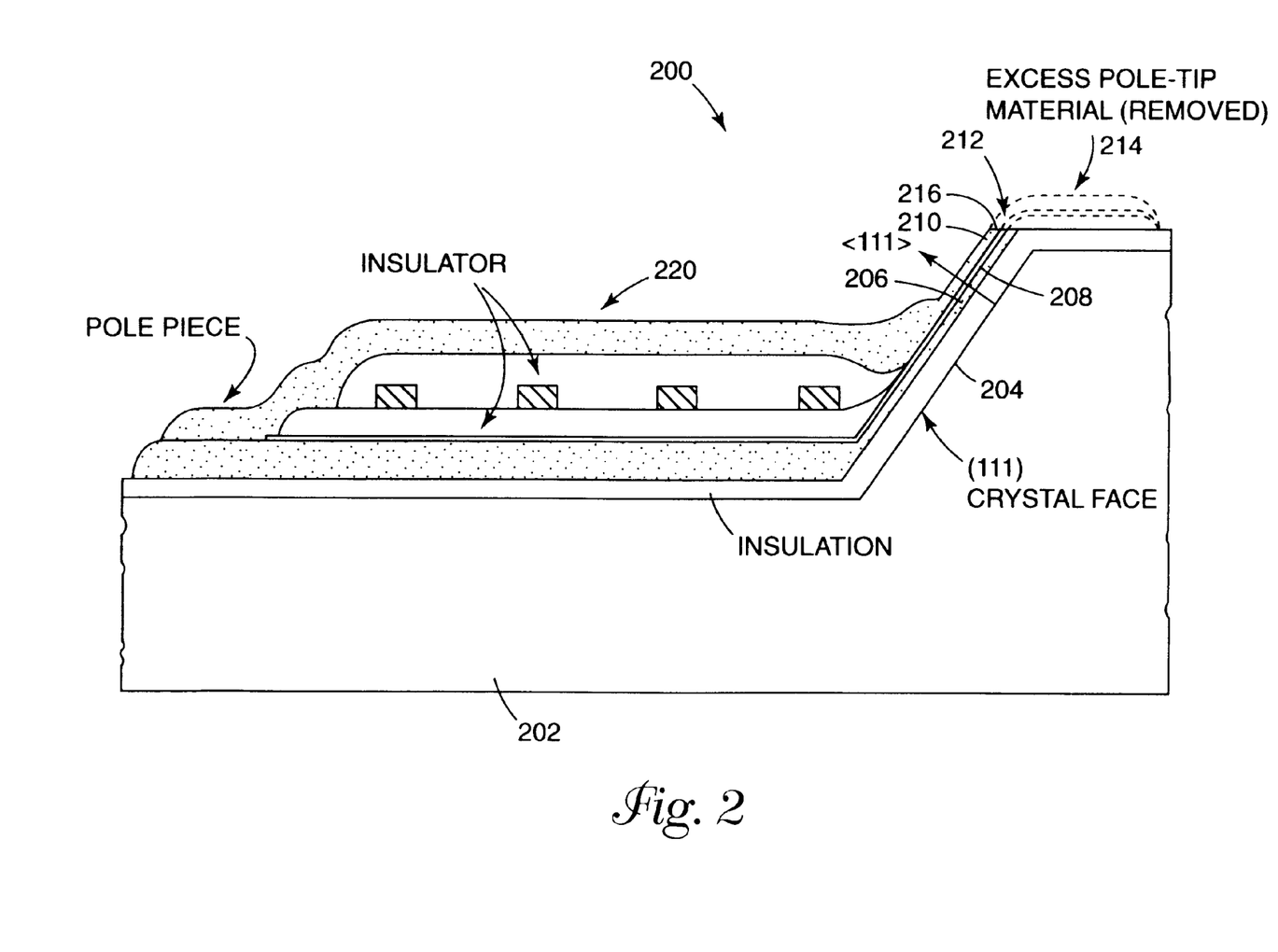
FIG. 2 illustrates the formation of an exemplary thin film magnetic head which may utilize a silicon coating according to the invention.

FIG. 2 illustrates the formation of an exemplary thin film magnetic head 200. Again, those skilled in the art will recognize that other methods and types of magnetic heads may be fabricated, and that the invention is not meant to be limited to the specific magnetic head described herein. A thin film head assembly 200 is made by depositing thin film layers on a prepared substrate 202, such as silicon. The substrate 202 may have a ridge 204 anisotropically etched into the surface, and the ridge 204 may be bounded by three crystallographic planes 206, 208, 210. The layers 206, 208, 210 are deposited so that the head pole pieces 212 are formed on the crystal face at the end of the ridge 204. Excess pole tip material 214 is removed to form the transducing gap 216.

The fabrication process begins with the masking and etching of an oxidized silicon wafer 202. The etching of the silicon wafer 202 is achieved in an anisotropic etchant, which leaves a ridge 204 that is bounded on four sides by the crystallographic planes 206, 208, 210. The silicon 202 is reoxidized, and a thin film head 220 is fabricated on the surface of the silicon layer 202. The thin film head 220 is positioned so that the pole tips 212 lie flat on the surface of the ridge 204. The wafer is then lightly polished to remove excess pole tip material 214.

Following this, the wafer 200 is sliced into rows of sliders, each having integral aerodynamic ridges. Then, the ridges 204 are beveled to further define an air bearing surface and the individual units are then diced from the rows. The head fabrication technique employing etching simplifies machining and polishing operations.

Figure 3:
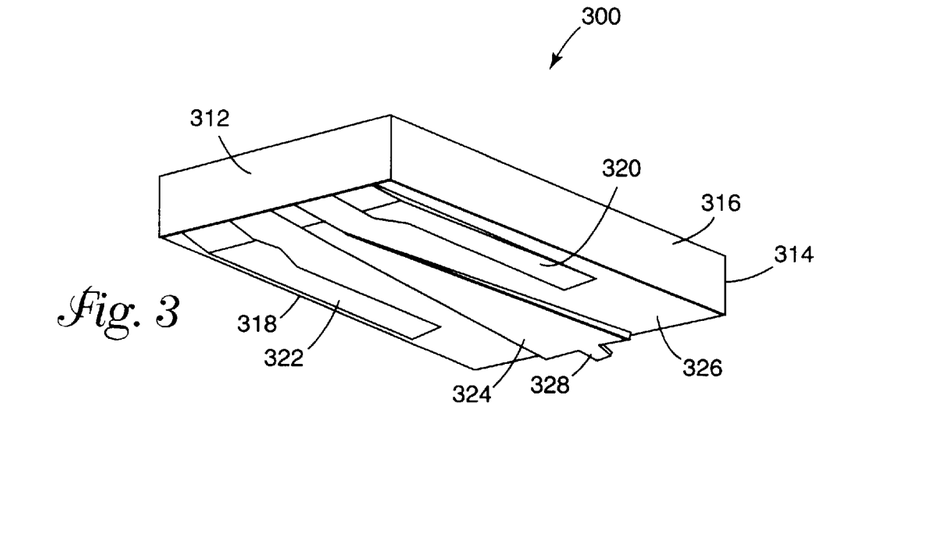
FIG. 3 illustrates a slider having exemplary air bearing surfaces formed thereon which may utilize a silicon coating according to the invention.

FIG. 3 illustrates a slider 300 having exemplary air bearing surfaces formed thereon. Those skilled in the art will recognize that other types of sliders may be fabricated, and that the invention is not meant to be limited to the specific slider described herein.

The slider 300 includes a leading edge 312, a trailing edge 314 and two side edges 316, 318. Two side air bearing surfaces or rails 320, 322 and a center rail 324 for a given aerodynamic performance standard may be disposed on a support structure 326. A transducer or magnetic head 328 is disposed on the center rail 324 at the trailing edge 314 for performing read/write operations on the disk. Alternatively, one or more transducers 328 may be formed on the side rails 320, 322 for a side-rail configuration, the side rail(s) 320, 322 in this case being fully extended to the trailing edge 314.

Figure 4:
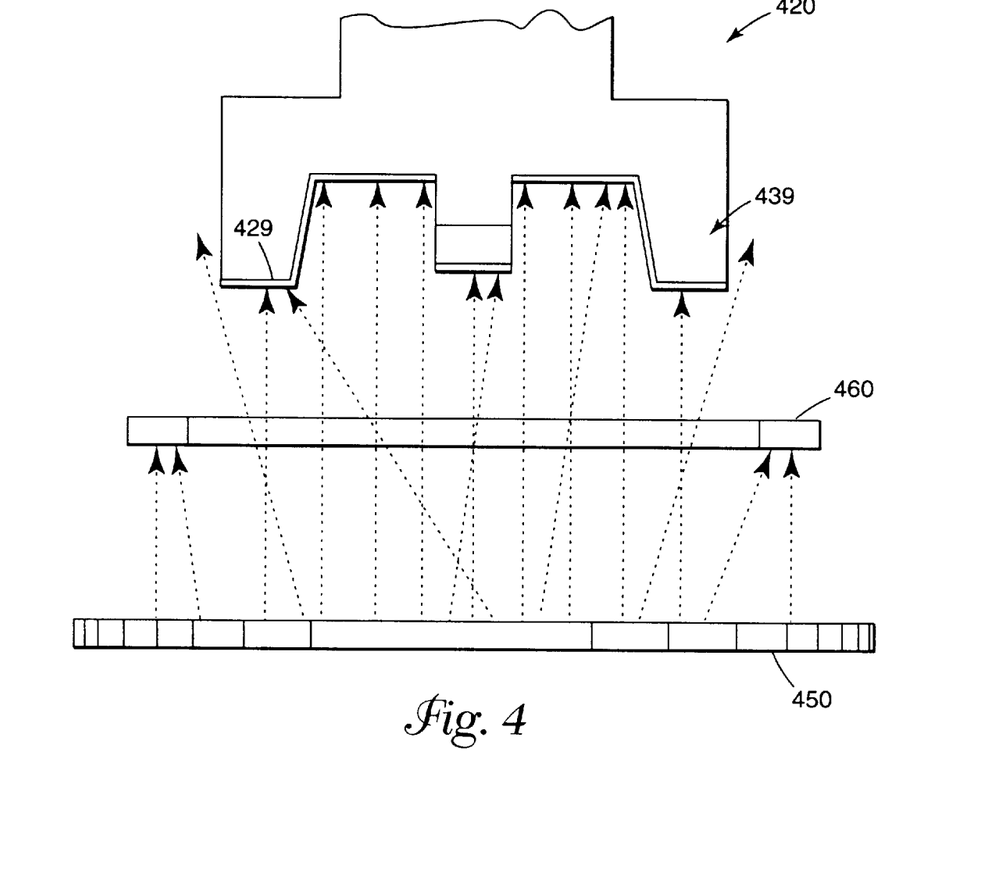
FIG. 4 illustrates the method by which a protective coating of silicon is placed upon the bottom of the slider.

Referring now to FIG. 4, an important aspect of the invention is the method by which a protective coating of silicon provided on the bottom of the slider, including the air bearing surface. Preferably a DC magnetron sputtering technique is used to deposit silicon. However, those skilled in the art will recognize that the silicon coating may be formed during the formation of the slider or may be applied to the slider using other techniques. Nevertheless, the DC magnetron sputtering technique provides a high rate deposition, which is a desirable manufacturing process because it provides a dense film due to higher energy bombardment during the deposition process. Accordingly, this high rate magnetron sputtering technique gives rise to a dense and low stress film on the slider.

Preferably, as stated above, silicon is deposited utilizing a DC magnetron sputtering process. First, the bottom of the slider 420, including the air bearing surface 439, is cleaned. Similarly, a sputtering source 450 or "target" is similarly cleansed. Next, the protective coating is deposited on the slider 420 air bearing surface side according to a predetermined mask 460.

According to the invention, the sputter deposited silicon 429 is used as the coating for the air bearing surface 439 for magnetic heads such as the planar silicon head disclosed in U.S. Pat. No. 4,949,207, herein incorporated by reference. This silicon coating 429 provides a debris-free interface between the head and disk, which results in excellent storage medium/transducer interface reliability.

In the case of a silicon slider, this silicon coating is preferably identical, or substantially identical in composition to the silicon slider body, hence no thermal mismatch exists and a stable slider dimension (crown, camber, pitch, etc.) can be maintained regardless of the temperature excursion in the file. Finally, since the optical properties of silicon are well known, silicon also provides a good reference surface for accurate flyheight measurement.

Figure 5:
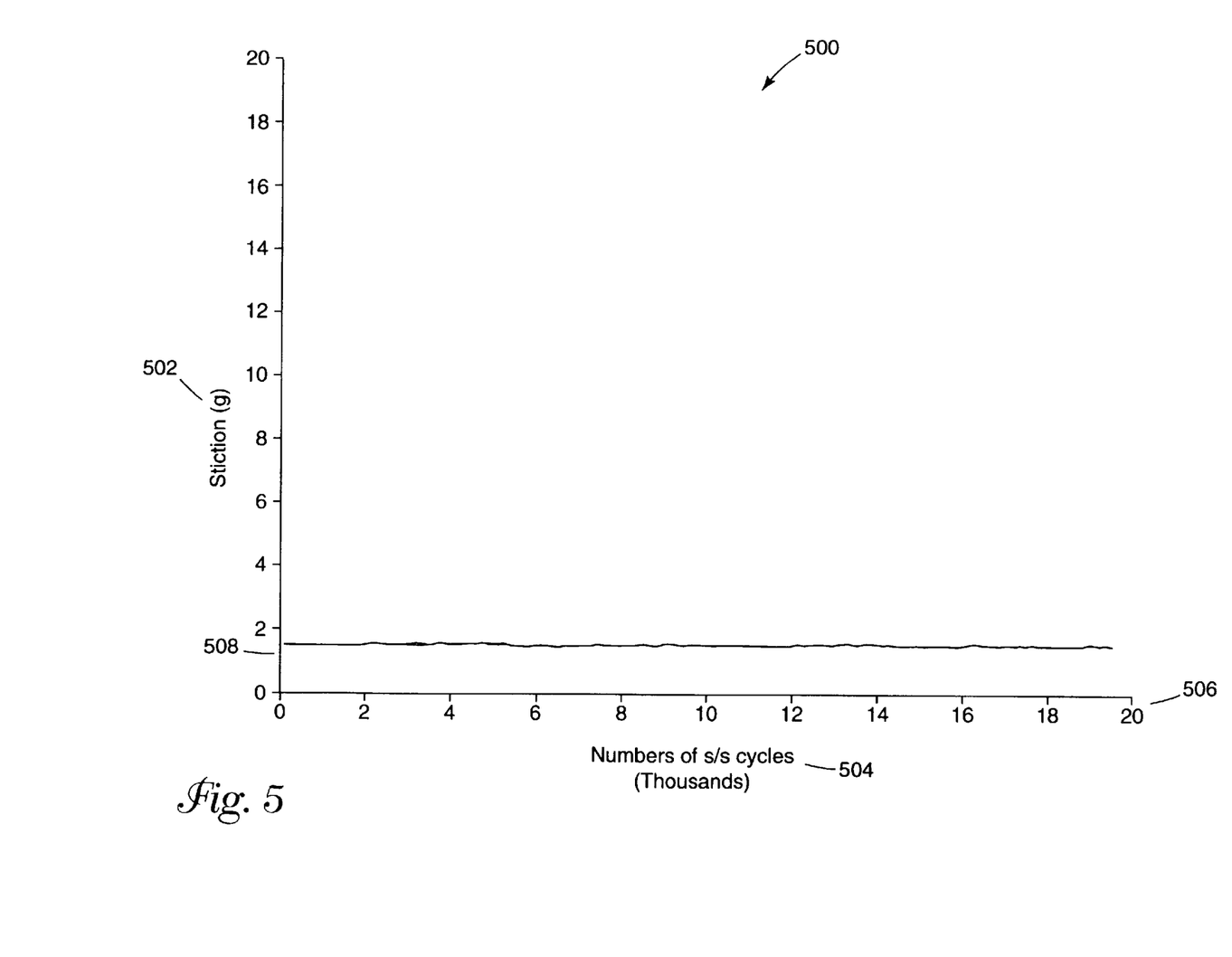
FIG. 5 illustrates the contact start-stop performance of a slider having a thick 4500 Angstrom silicon coating.
Figure 6:
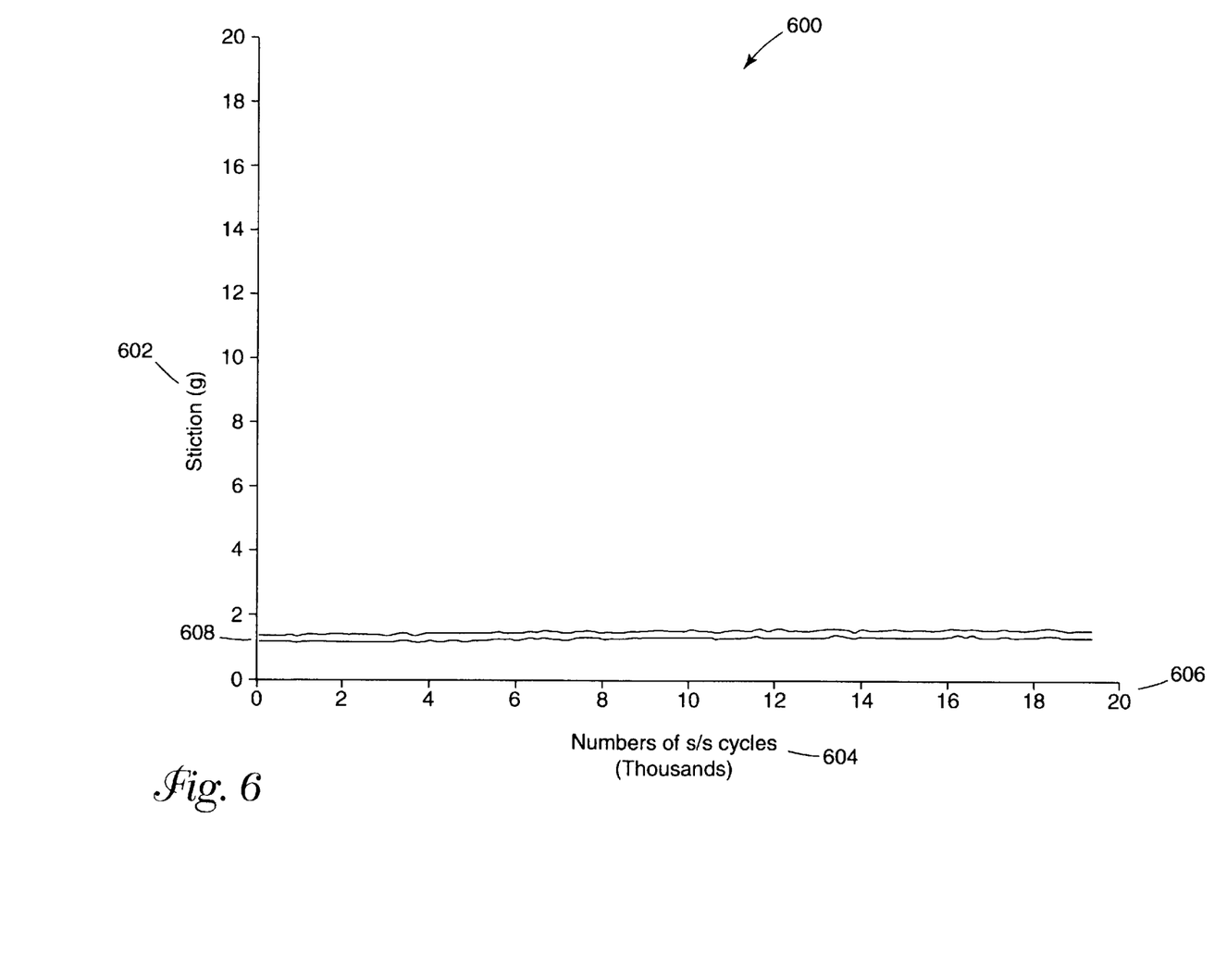
FIG. 6 illustrates the contact start-stop performance of a slider having a thin 125 Angstrom silicon coating.

Sliders with thick (on the order of 4500 Å) and thin (on the order of, or substantially, 125 Å) single layer silicon coatings 429 have been prepared and tested in the standard Contact Start-Stop (CSS) station. FIGS. 5 and 6 illustrate the excellent results obtained after twenty thousand cycles.

FIG. 5 illustrates the contact start-stop performance 500 of a slider having a thick, 4500 Angstrom silicon coating. In FIG. 5, the stiction 502 is plotted for the range of start-stop cycles 504. Throughout the cycling process, i.e., twenty thousand cycles 506, the stiction remains relatively constant at less than two grams 508.

FIG. 6 illustrates the contact start-stop performance 600 of a slider having a thin 125 Angstrom silicon coating. In FIG. 6, the stiction 602 is plotted for the range of start-stop cycles 604. Again, the stiction remains relatively constant at less than two grams 608 throughout the cycling 606.

In tests, sliders having a silicon overcoat according to the invention exhibit no debris accumulation on their air bearing surfaces after prolonged contact start-stop testing. In contrast, sliders with a TiW coating over the air bearing surface exhibit heavy debris accumulation on the air bearing surface after the same test. In fact, sliders with a TiW coating over the air bearing surface began to crash after less than one thousand (1000) contact start-stop cycles due to the heavy debris accumulation.

In summary, a silicon overcoat having a better combination of durability and optical properties as compared to TiW has been disclosed. The silicon overcoat is compatible with different slider body materials such as silicon which imposes little concern about the thermal expansion and mechanical stress effects on the slider. Since the silicon layer can be planarized with the pole tips, magnetic spacing loss is avoided.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of fabricating a slider, comprising the steps of:

forming a slider body having a leading end, a trailing end, and an air-bearing surface; and forming a single exterior layer of elemental silicon on the air-bearing surface of the slider body to form an exterior protective contact layer for preventing wear of the slider body.

2. The method of claim 1 wherein the step of forming the slider body comprises the step of forming at least one rail.

3. The method of claim 1 wherein the step of forming the single exterior layer of elemental silicon comprises the step of depositing a substantially 125 Angstrom silicon layer.

4. The method of claim 1 wherein the step of forming the single exterior layer of elemental silicon comprises the step of depositing a silicon layer of 6500 Angstroms or less.

5. The method of claim 1 wherein the step of forming the slider body comprises the step of fabricating the slider body from silicon.

6. The method of claim 5 wherein the step of forming the single exterior layer of elemental silicon comprises the step of forming the single exterior layer of elemental silicon substantially identical in composition to the slider body.

7. The method of claim 1 wherein the step of forming comprises the step of applying the single exterior layer of elemental silicon on the bottom of the slider body.

8. The method of claim 1 wherein the step of forming the single exterior layer of elemental silicon further comprises the step of planarizing the single exterior layer of elemental silicon to prevent magnetic spacing loss.

9. The method of claim 1 wherein the step of forming the single exterior layer of elemental silicon comprises the step of sputtering the single exterior layer of elemental silicon on the air bearing surface.

10. The method of claim 9 wherein the sputtering of the single exterior layer of elemental silicon forms a substantially stress-free silicon layer.

11. The method of claim 1, wherein the single exterior layer of elemental silicon has optical properties conducive for making accurate fly height measurements.

* * * * *

UNITED STATES PATENT AND TRADEMARK OFFICE
CERTIFICATE OF CORRECTION

PATENT NO.   : 6,117,283
DATED        : September 12, 2000
INVENTOR(S)  : Chen et al.

It is certified that error appears in the above-identified patent and that said Letters Patent is hereby corrected as shown below:

Column 6,
Line 65, please insert -- the single exterior layer of elemental silicon -- after the word forming and before the word "comprises".

Signed and Sealed this

Third Day of September, 2002

*Attest:*

*Attesting Officer*

JAMES E. ROGAN
*Director of the United States Patent and Trademark Office*